United States Patent [19]

Cline

[11] Patent Number: 6,062,363

[45] Date of Patent: May 16, 2000

[54] DRIVE ENGAGEMENT MECHANISM

[76] Inventor: Russell Cline, Suite D-100, 3333 S. Wadsworth Blvd., Lakewood, Colo. 80227

[21] Appl. No.: 09/206,088

[22] Filed: Dec. 4, 1998

[51] Int. Cl.[7] .................................................... F16D 11/04
[52] U.S. Cl. ........................................... 192/69.9; 192/69
[58] Field of Search ....................................... 192/69.9, 69

[56] References Cited

U.S. PATENT DOCUMENTS

| | | | |
|---|---|---|---|
| 2,684,741 | 7/1954 | Gregory | 192/69.8 |
| 3,701,404 | 10/1972 | Cassell | 192/69.62 X |
| 4,161,242 | 7/1979 | Moores, Jr. et al. | 192/69.8 X |
| 4,553,652 | 11/1985 | Fallos | 192/69.61 X |
| 4,832,184 | 5/1989 | DeGood | 192/69.62 X |
| 4,869,354 | 9/1989 | Brazier | 192/69.9 |
| 5,307,965 | 5/1994 | Worrel | 192/69 X |
| 5,581,939 | 12/1996 | Regan et al. | 192/69.62 X |

*Primary Examiner*—Charles A. Marmor
*Assistant Examiner*—Scott Lund Au

*Attorney, Agent, or Firm*—Ramon L. Pizarro; Edwin H. Crabtree

[57] ABSTRACT

A drive engagement mechanism for providing selective engagement with a drive shaft where the drive shaft includes a surface having a discontinuity. The engagement mechanism includes a cylindrical hub with an external surface and an aperture extending along the longitudinal axis of the cylindrical hub. The hub includes a protrusion for engaging the discontinuity on the shaft and a surface for allowing rotational and sliding support of the hub against the shaft. The hub is mounted within a support frame that provides sliding and rotational support to the hub from the external surface of the hub, so that the hub may slide along the axis from a first position where the protrusion engages the discontinuity on the shaft, to a second position where the protrusion does not contact the discontinuity and thus disengages the shaft. Structure for moving the hub from the first position to the second position is also provided, so that the hub is supported next to the shaft by the support frame and so that when the hub is in the first position the hub engages the discontinuity on the shaft to transmit power from the shaft and when the hub is slid to the second position the hub is disengaged from the discontinuity.

12 Claims, 4 Drawing Sheets

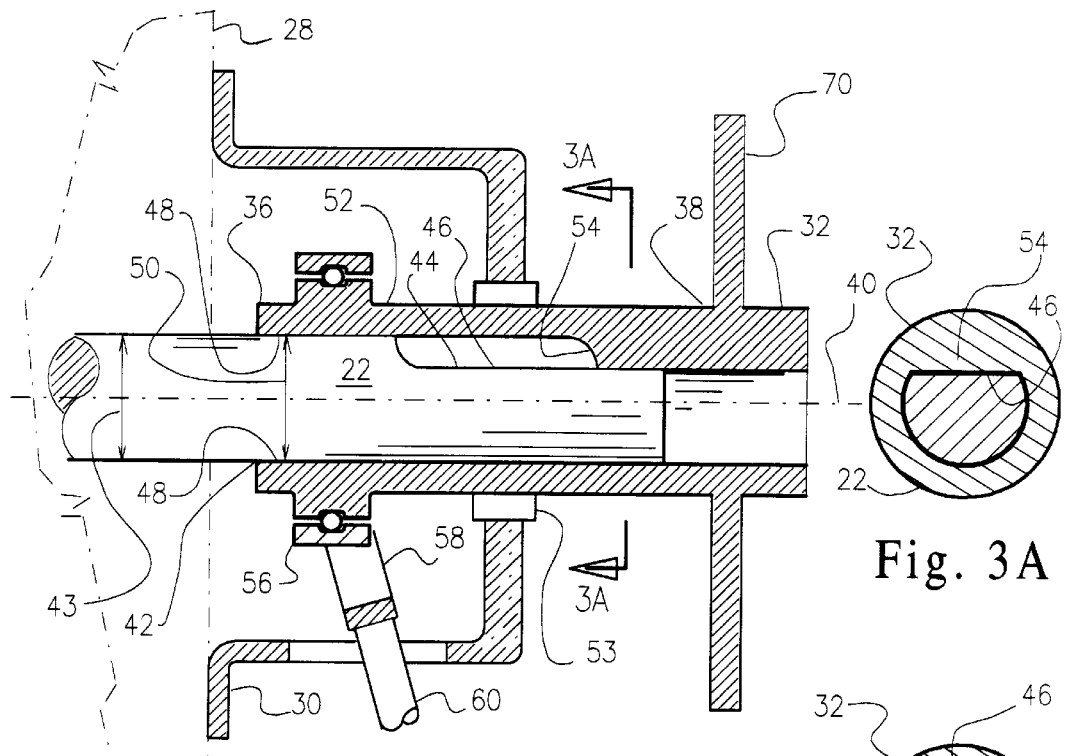
Fig. 3
Fig. 3A
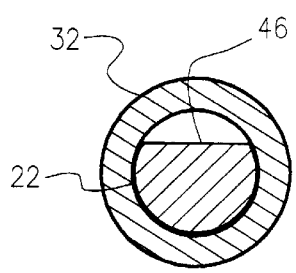
Fig. 4A
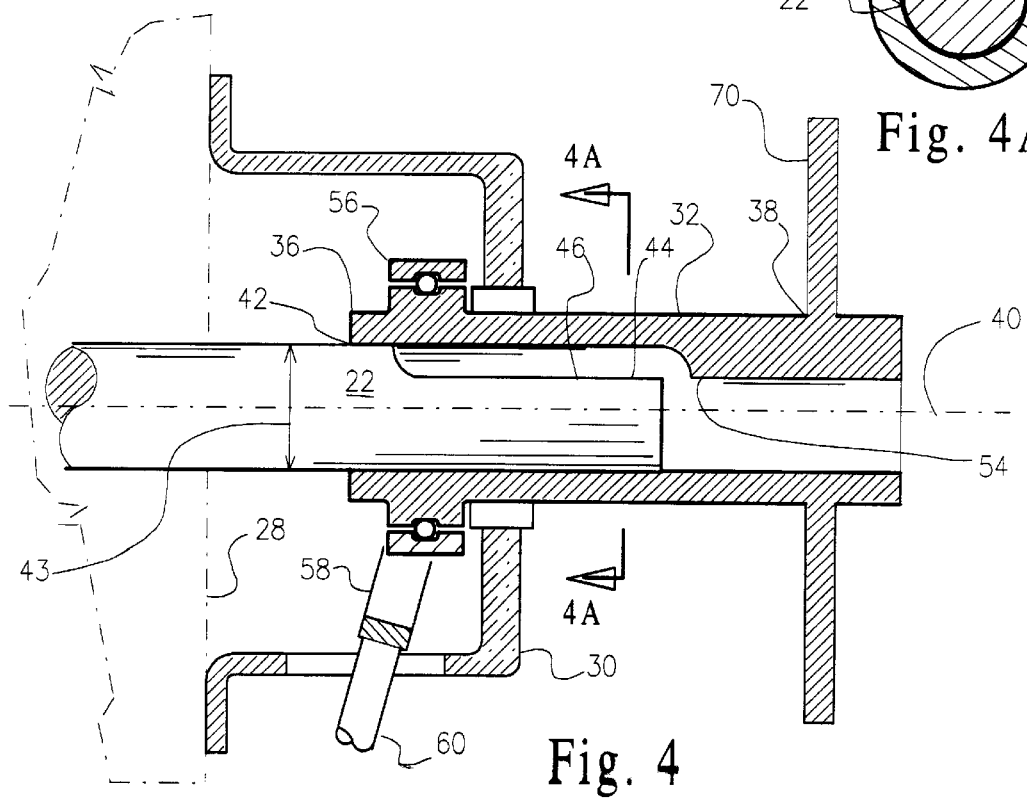
Fig. 4

DRIVE ENGAGEMENT MECHANISM

BACKGROUND OF THE INVENTION (a) Field of the Invention

This invention generally relates to a clutch mechanism for engaging a drive shaft to a drive sprocket. More particularly, but not by way of limitation, to a clutch mechanism which allows disengagement of a drive pulley, hub, and the like, through a sliding action.

(b) Discussion of Known Art

Various clutch mechanisms have been developed, each including physical features that offer advantages for the particular application. Known clutch mechanisms fixedly attach components of the clutch mechanism directly to the drive shaft. The attachment of the clutch components to the drive shaft is typically carried out by providing a flattened section on the drive shaft. One of the clutch's components is then fastened to the drive shaft by means of a set-screw, key, or the like. For example, it is known that a friction plate and fly-wheel combination may be attached to the drive shaft by way of a key. The key or other attachment transmits torque, primarily as a shear force, from the drive shaft on through to the clutch components. The friction plate and fly wheel will then cooperate with an opposing friction plate to transmit power to a driven shaft. Thus, known clutch mechanisms achieve the selectable engagement result by adding components which fixedly connect to the drive shaft, and thus require additional components that complicate the mounting and actuation of the clutch mechanism. These additional components make proper installation of the clutch mechanism difficult. Difficulties associated with the installation in turn lead to operational difficulties and power transfer inefficiencies.

This approach to the construction of clutch mechanisms has significant disadvantages in that the attachment of a clutch component to the drive shaft requires the provision and alignment of a mating element in the driven shaft. The mounting of mating elements on a pair of shafts involves precision machining or skilled labor for proper alignment and operation. Additionally, the stacking of several components in series can lead to serious problems with mounting space, necessitating the use of parallel gearing or mounting mechanisms to reduce the overall length of the installation. For example, in the mechanisms discussed in U.S. Pat. No. 5,557,887 to Fellows et al. Illustrates the use of a parallel shaft attached to reducing gears which eventually lead to an output shaft.

A known clutch or selectively connectable coupling is shown in FIG. 3 of U.S. Pat. No. 5,222,327 to Fellows et al ("Fellows '327"). The mechanism shown in the Fellows '327 patent includes a a sliding gear with a splined aperture that is supported on a mating splined drive shaft. The gear can then be engaged or disengaged from succeeding drive train components by a movement of the gear over the splined shaft.

Other known publications teach mechanisms that are particularly useful in the selective engagement of drive mechanisms for overhead garage doors. These publications include U.S. Pat. No. 5,222,403 to Angelini et al., U.S. Pat. No. 4,472,910 to Iha, U.S. Pat. No. 4,131,830 to Lee et al., U.S. Pat. No. 3,722,141 to Miller, and U.S. Pat. No. 3,220,718 to Wikkerink. A review of these publications reveals a need for a simple selective engagement mechanism for the drive mechanism on systems such as garage door drive systems. Importantly, there remains a need for a selective engagement mechanism that can be attached to the drive system of a wide variety of drive mechanisms, the engagement mechanism cooperating with the output shaft of drive mechanism.

Furthermore, there remains a need for simple selective engagement mechanism that can be activated by a variety of linear, rotary, or leverage devices.

Still further, there remains a need for a selective engagement or clutch mechanism that eliminates components, such as a drive shaft attachment, while still maintaining the function of selective engagement.

SUMMARY

It has been discovered that the problems left unanswered by known art can be solved by providing a selective engagement mechanism or clutch which includes:

a support housing; and a hub which is slidably supported by the housing.

In a preferred embodiment of the invention the housing is simply a support that holds the hub over a drive shaft and permits the hub to slide along the drive shaft from an engagement, or driving, position to a disengagement position. The engagement of the shaft and hub will be carried out by a friction or shear force transmitting element. In a highly preferred embodiment of the invention the friction or shear force transmitting element includes a protrusion on the hub which mates with a recess of the type commonly found on the drive shaft.

Thus, it will be appreciated that an important feature of the instant invention is the use of the housing to provide sliding support to the hub at a desired position relative to the drive shaft. The use of the housing as the support for the hub allows mounting of the hub on a variety drive mechanisms which include an output shaft. For example, in garage door opening mechanisms many manufacturers provide drive systems which include a drive motor, reducing gears, and actuation systems. The drive system will typically include an enclosure which allows mounting of the drive system on a wall, overhead support, or other structure, and includes an opening from which extends a drive shaft. The drive shaft will include a flat portion or recess which has customarily been used to fixedly mount a drive pulley, gear, or the like.

It has been discovered that by providing a clutch mechanism that avoids the need to fixedly attach one of the clutch components to the driving or power shaft, and particularly to a spindle, one produces a new and useful clutch mechanism that eliminates elements of known clutch mechanisms, while maintaining the functions of known clutch mechanisms.

Additionally, important new and useful synergistic results have been produced by providing a clutch mechanism that cooperates directly with the output shaft of a drive system. The disclosed mechanism allows the user to mount the instant invention directly over, or against, the enclosure or surface which surrounds the output shaft. This allows proper positioning and installation of the disclosed mechanism by relatively unskilled workers.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which:

FIG. 1 is an elevational view of an installation of an embodiment of the invention as used with a garage door opening system.

FIG. 2 an exploded, perspective view of components of the invention and their mounting on to a spindle.

Figure 3B:
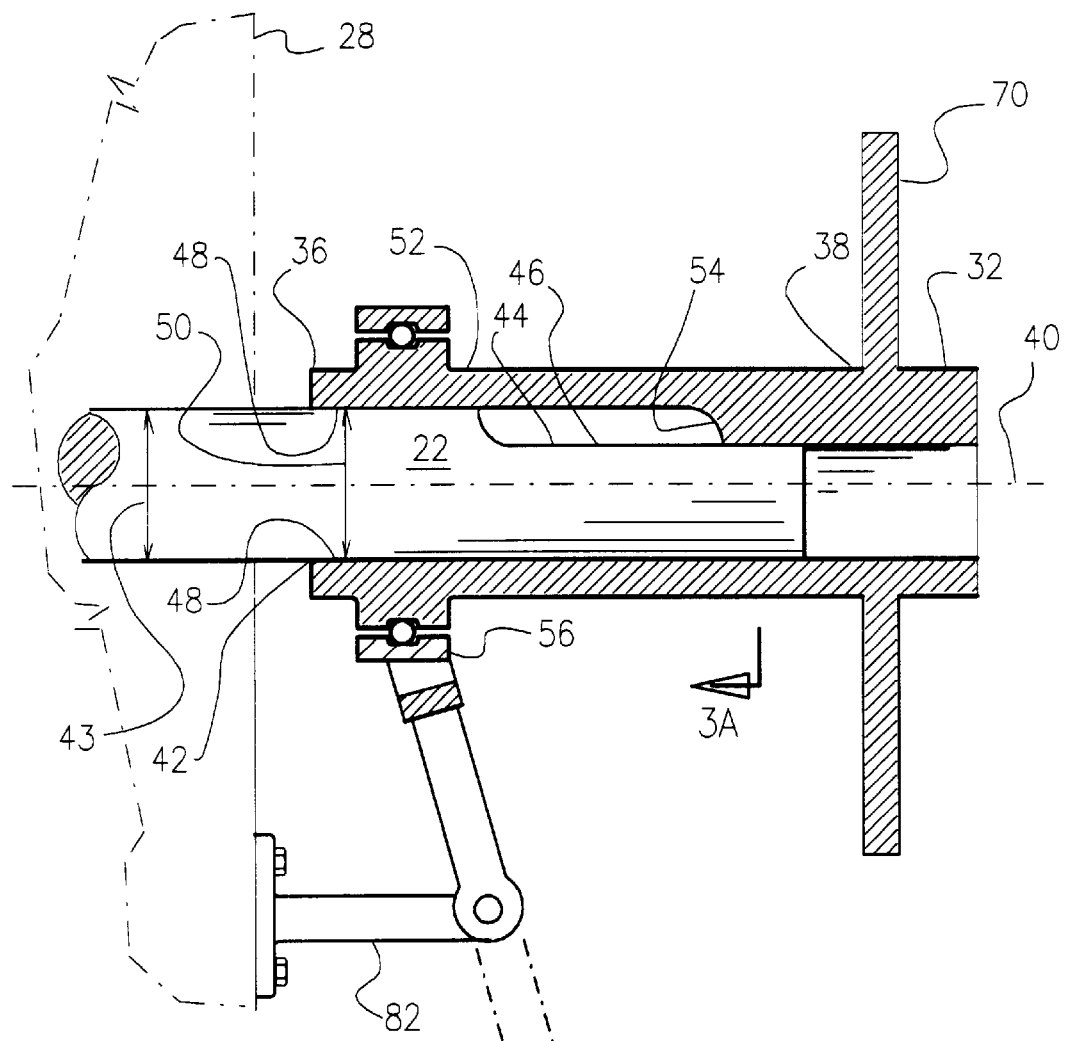
FIG. 3 is a side view of an embodiment of the invention, the invention shown in the engaged position cooperating with a spindle. The view is an elevational view like FIG. 1, with portions of the components broken away to illustrate the cooperation with the spindle.
FIG. 3A is a sectional view taken from the location indicated on FIG. 3.

FIG. 3B is a side view of another embodiment of the invention, the invention shown in the engaged position cooperating with a spindle. The view is an elevational view like FIG. 1, with portions of the components broken away to illustrate the cooperation with the spindle. The view illustrates the mounting of a handle (in dashed lines) against the housing of the drive system to move the hub from an engaged position to a disengaged position.

Figure 3C:
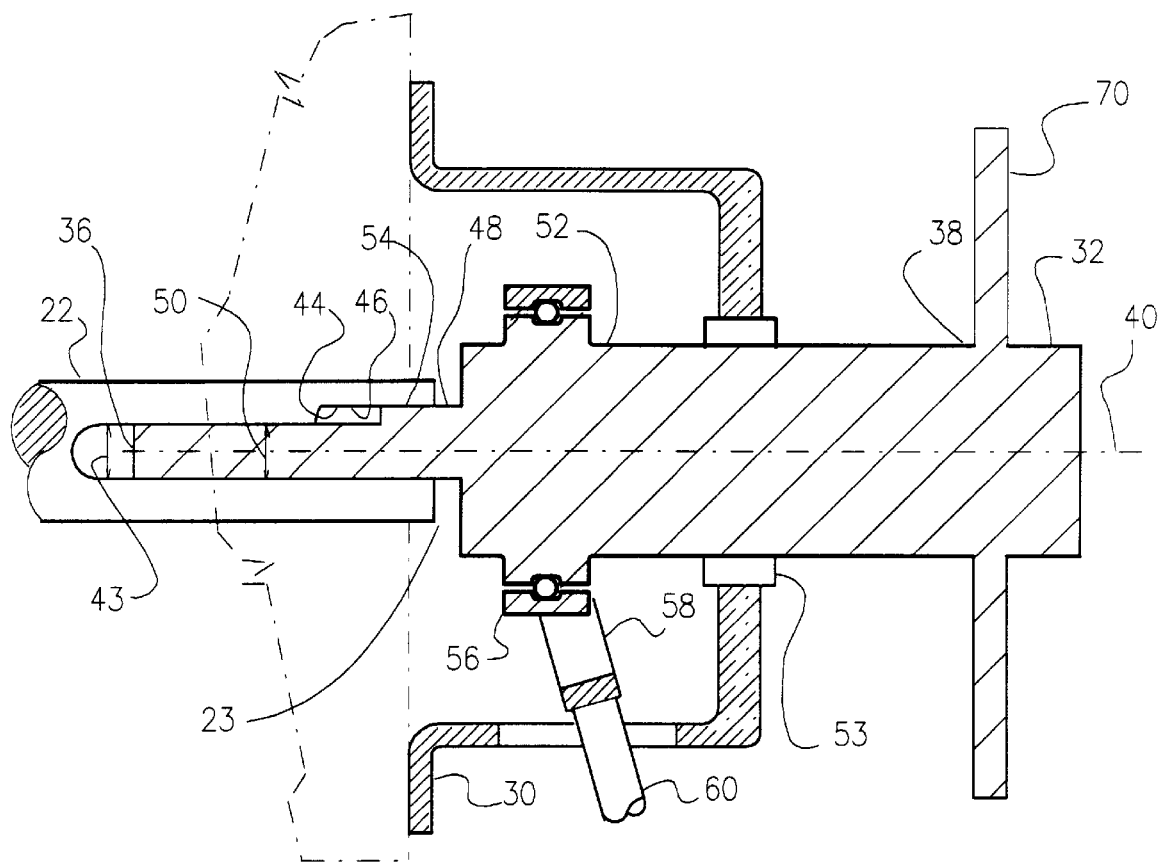

FIG. 3C is yet another embodiment of the invention, the view being similar to FIG. 3.

FIG. 4 is a side view of an embodiment of the invention, the invention shown in the disengaged position, moved away from the spindle as shown on FIG. 3. The view is an elevational view like FIG. 1, with portions of the components broken away to illustrate the cooperation with the spindle.

FIG. 4A is sectional view taken from the location, and in the direction, indicated on FIG. 4.

DETAILED DESCRIPTION OF EXEMPLAR EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 1:
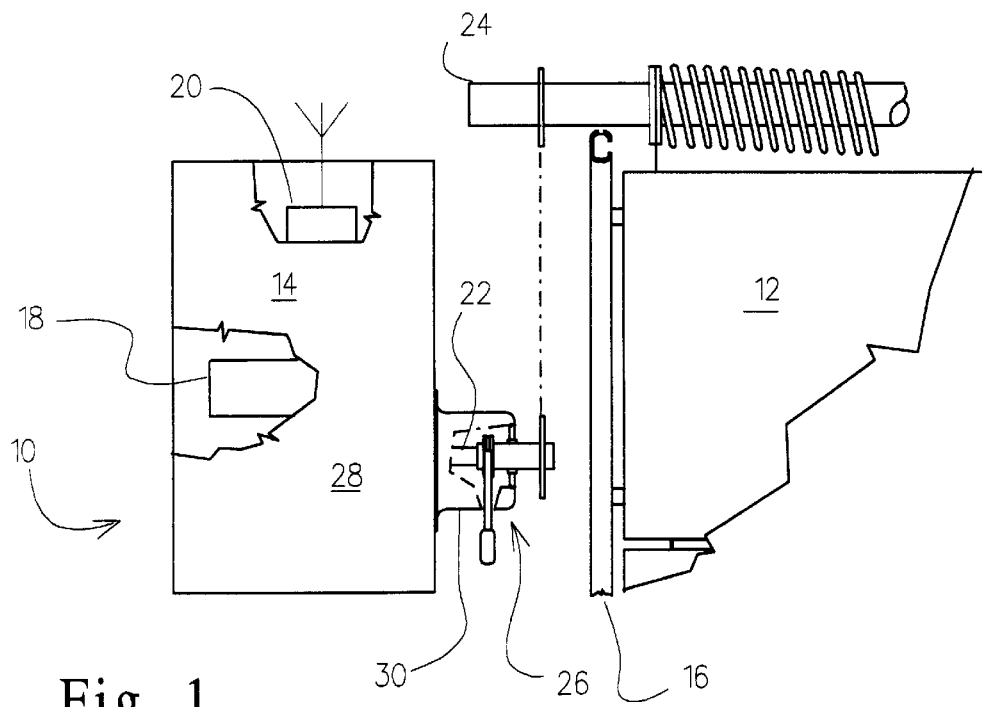

In FIG. 1 a typical installation of a garage door opening system 10 has been illustrated. The garage door opening system 10 is used to open the garage door 12, which may be an overhead garage door 12 as illustrated. The illustrated garage door opening system 10 uses a drive system 14 to provide the torque required for raising the garage door 12. The garage door 12 shown is mounted on rails or tracks 16 that guide the motion of the garage door 12 from a closed position to an open position.

The installation illustrated in FIG. 1 is a side mounted door opening system because it is mounted next to the opening that is to be closed off by the garage door 12. Other known garage door opening systems include drive mechanisms which are mounted on the ceiling near the door opening. The power required for raising the garage door 12 in the illustrated system is provided by the drive system 14, which will preferably be installed as a side mounted system.

The torque from the drive system will be provided by a drive motor 18 which will be controlled by a motor control system 20. The motor control system 20 will serve to control the torque delivered from the drive motor 18. Torque from the drive motor is delivered from the drive system by means of a drive shaft 22 which will extend from a housing 28 which will hold the drive motor 18 together with the associated motor control systems 20. It is important to note that the drive shaft 22 will not necessarily be directly connected to the drive motor 18. It is contemplated that drive reduction or other systems may be included between the drive motor 18 and the drive shaft 22. Also, the motor control system 20 may include remote control actuation systems which may accept air borne or other signals.

Also illustrated on FIG. 1 is that the drive system 14 is used to drive a counterbalance shaft 24 which in turn is used to transmit the power needed to raise the door 12. The driving connection between the drive system 14 and the counterbalance shaft 24 will preferably include a clutch or disconnect mechanism that allows the user to disconnect the drive system 14 from the counterbalance shaft 24 to allow the user to open the garage door 12 manually in the event of a power or other failure in the garage door opening system 10.

In order to allow the user to selectively engage or disengage the drive system 14 from the counterbalance shaft 24 a drive engagement mechanism 26 which provides selective engagement of the drive shaft 22 has been shown in FIGS. 1–4A. The illustrated drive engagement mechanism 26 allows the user to selectively disengage the drive shaft 22 from the counterbalance shaft 24.

Figure 2:
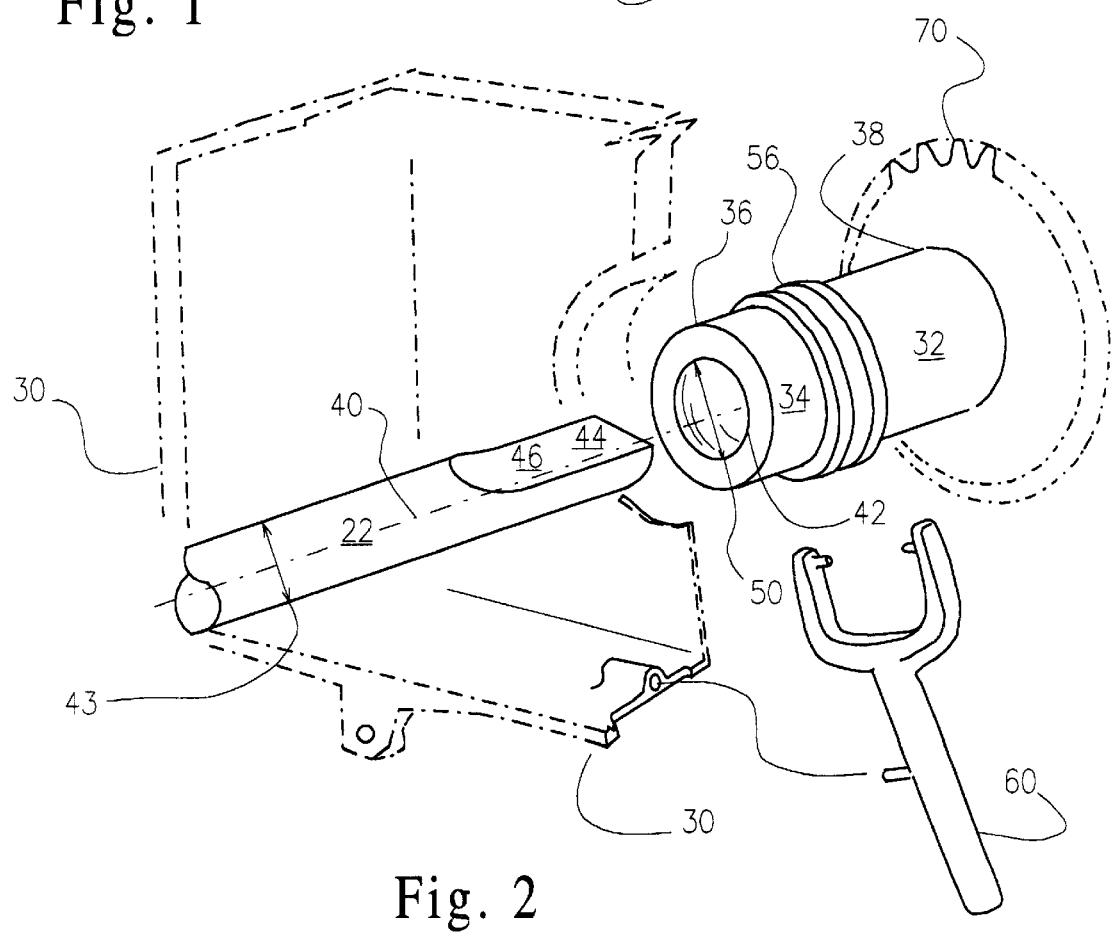

Turning now to FIGS. 1 and 2, where further details of a contemplated installation of the instant invention have been illustrated. In the embodiment illustrated on FIGS. 1 and 2 the drive engagement mechanism 26 is mounted against the housing 28 of the drive system 14. The drive engagement mechanism 26 includes a frame 30, which in a preferred embodiment encloses most of the drive engagement mechanism to serve as a housing for enclosing much of the drive engagement mechanism 26. Additionally, the drive engagement mechanism has been mounted over the drive shaft 22, so that the drive shaft 22 has been accepted by, or is surrounded by, the drive engagement mechanism 26.

Referring now to FIGS. 2 and 3, it will be understood that in a highly preferred embodiment of the invention the drive engagement mechanism 26 includes a hub 32 which includes an external surface 34, a first end 36, a second end 38, and an axis 40 extending from the first end 36 towards the second end 38. In the illustrated embodiment the hub 32 includes an aperture 42 which extends along the axis 40 from the first end 36 of the hub 32 towards the second end 38 of the hub 32.

Also shown in FIG. 2 is that it is contemplated that the drive shaft 22 is of a diameter 43 and will include a discontinuity 44, which simply may be a flat area 46 on a generally round shaft. It is also contemplated that the term discontinuity will also include features such as splines as well as features such as a series of flat areas, regardless of whether together they form a regular or irregular shape, such as a triangle, square, or other shapes with at least one flat surface or similar discontinuity. However, it is contemplated that the discontinuity will typically be incorporated on to the drive shaft 22 to allow fixed attachment of components such as gears, pulleys or the like. Still further, it is contemplated that the discontinuity may be embodied as one of many known means for attaching a component to a shaft, such as keyways, set-screws, protrusions or other discontinuities. Additionally the discontinuity may be a spline or similar external or internal to the drive shaft 22. For example, as shown in FIG. 3C, it is contemplated that the drive shaft 22 may include an aperture in its free end 23 with a discontinuity as described above. The aperture would be able to accept a protrusion or mating discontinuity along the hub 32. The hub 32 in this embodiment can be inserted into the aperture in the drive shaft 22 to engage the system. The first end 36 of the hub of this embodiment also includes a support surface which cooperates with the drive shaft 22 to support the hub over the drive shaft 22.

As shown on FIG. 3, a portion of the hub 32 includes means for engaging the discontinuity 46 on the drive shaft 22. Additionally, a portion 52 of the hub 32 includes surfaces 48 spaced apart at a distance 50 which is approximately equal to the diameter 43 of the drive shaft 22. The proportions of the portion 52 allow the hub 32 to rest or be supported by the shaft 22 while allowing the shaft 22 to be rotated relative to the hub 32 while the hub 32 slides over the shaft 22. Thus, the portion 52 of the hub 32 includes a surface that allows the hub 32 to cooperate with the drive shaft 22 to rotatably and slidably support the hub 32 against the shaft.

FIG. 3 also illustrates that it is contemplated that the frame 30 will attach to the housing 28 of the drive system 14 and support the hub 32 at a desired position relative to the housing 28 and the drive shaft 22 which extends from the housing 28. Also illustrated is that the frame 30 will preferably support the hub 32 through means 53 for allowing sliding and rotational motion of the hub 32 relative to the frame 30. Thus it will be understood that in a highly preferred embodiment of the invention the hub 32 will be supported at a location between the first end 36 and the second end 38 by the means 53 which will allow rotation and sliding motion of the hub 32 relative to the frame 30 and the shaft 22. Additionally, as discussed above, in a preferred embodiment of the invention the shaft 22 will provide support to the hub 32 along an area near or at the first end 36 of the hub 32, resulting in support for the 32 at two locations along the axis 40 of the hub 32.

In FIGS. 1 through 4, and particularly in FIGS. 3, 3A, 4 and 4A, it has been illustrated that the hub 32 will moveable or slideable along the shaft 22, along the axis 40, from a first position, illustrated in FIGS. 3 and 3A, to a second position, illustrated in FIGS. 4 and 4A. When the hub 32 is in the first position, the drive engagement mechanism 26 will be in an engaged position, which will allow transmission of torque from the drive shaft 22 to the hub 32.

To transmit torque from the drive shaft 22 to the hub 32, the aperture 42 in the hub 32 will preferably include a means for engaging the discontinuity 44 on the shaft 22. In a highly preferred embodiment of the invention these means for engaging the discontinuity 44 includes a protrusion 54 which occupies a portion of the aperture 42 and extends less than the length of aperture 42 along the axis 40. This arrangement allows the protrusion 54 to engage the flat area 46, as shown on FIG. 3A, to engage the drive shaft 22 and transmit torque from the drive shaft 22 to the hub 32. Clearly, it is contemplated that an additional power transmission element or means for transmitting rotary motion 70, such as a gear, sprocket, pulley, or the like, may be mounted along the hub to then transmit power on to the counterbalance shaft 24 to open or close the garage door, for example.

To disengage the hub 32 from the drive shaft 22, the hub 32 is slid along the shaft 22 to the second position, illustrated in FIGS. 4 and 4A. When the hub 32 is the second position, the protrusion 54 will be disengaged from the discontinuity 44 on the drive shaft 22, allowing the hub 32 to rotate freely about the shaft 22. Thus, when the hub 32 is in the second position, and the hub 32 is attached to other power transfer means, as shown on FIG. 1, to open or close a garage door, the garage door may be opened manually.

It is contemplated that the movement of the hub 32 between the first position and the second position may be carried out by placing a bearing 56 that is fixed to the external surface 34 of the hub 32. Mounted to the bearing 56 is a lever or connector 58 which can be used to impose a force on the hub 32 along the axis 40. It is contemplated that the force to move or slide the hub 32 along the shaft 22 may be provided by a lever 60 which is pivotally mounted on the frame 30, as shown on FIG. 2, so that the entire drive engagement mechanism 26 may be distributed as a single unit. Clearly it is contemplated that alternative means for moving the hub 32 along the shaft 22 may be used without departing from the true spirit and scope of the instant invention. For example, it is contemplated that a solenoid, or spring loaded linear actuator (not shown), may be used in place of the lever or handle 60. Also, although it is preferred that a bearing 56 be used to attach the means for moving the hub, it is also contemplated that a smooth surface, as well as other sliding connectors may be used in place of the bearing 56. Still further, it is contemplated that the handle 60 may be supported from a pivot attached to frame structure that is proximate to the housing 28 or may even be mounted directly from the housing 28 by using a pivot support 82 to move the handle 60 in the direction of arrow 84, as illustrated in FIG. 3B.

It is important to note that by providing a drive engagement mechanism that is sold as a single unit, one produces a drive engagement system that is easily mounted or attached to the drive system 14 with reliable, consistent, results by relatively unskilled labor. Thus, it is contemplated that the frame 30 will serve as a housing which can attach by means of fasteners or the like against the housing 28 of the drive system 14 so that the frame 30 attaches next to the drive shaft 22, positioning the hub over and about the shaft 22, allowing the hub 32 to slide over the shaft 22 to carry out the engagement and disengagement functions of the instant invention. In other words, the frame 30 positions the hub 32 over the shaft 22 so that the shaft 22 fits within the aperture 42 of the hub 32.

It is further contemplated that the protrusion 54 may be spring loaded, so that it may recede when sliding over different features along the shaft 22. This spring loaded arrangement would allow the use of the invention with applications where the discontinuity on the shaft 22 is simply a keyway with an arched contour, such as a keyway made for use with a Woodruff key or with a pin hole or other discontinuity used for attaching a power transmission element on the shaft 22.

Thus it can be appreciated that the above described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. A shaft mountable drive engagement mechanism for providing selective engagement with a drive shaft, the drive shaft having a diameter and a surface having a discontinuity, the drive engagement mechanism riding on the drive shaft while in a first, engaged, position and while in a second, disengaged, position, the drive engagement mechanism comprising:

a hub adapted for mounting along the drive shaft, the hub having an external surface, a first end and a second end, and an axis extending from the first end towards the second end, the second end having a power transmission component, the hub further having an aperture extending along the axis from the first end towards the second end, so that the hub is adapted to receive the drive shaft through the first end towards the second end, a first portion of the aperture next to the first end of the hub being of a diameter that is approximately equal to the diameter of the drive shaft, so that the diameter of the aperture next to the first end of the hub allows rotational and sliding support of the hub against the drive shaft, a second portion of the aperture near the second end of the hub providing a means for engaging the discontinuity of the drive shaft, the means for engaging the discontinuity occupying a portion of the aperture and extending less than a length of the aperture, so that the means for engaging the discontinuity is not in contact with the discontinuity on the drive shaft when the hub is in the second position; and means for moving said hub from said first position to said second position, so that when the hub is in the first position the hub engages the discontinuity on the drive shaft to transmit power from the drive shaft to the power transmission component, and when the hub is slid to the second position the hub is disengaged from the discontinuity on the drive shaft.

2. A drive engagement mechanism according to claim 1 wherein said first end of said hub includes a support surface that is adapted for mounting against the drive shaft, so that the hub is at least partially supported by the drive shaft.

3. A shaft mountable drive engagement mechanism for providing selective engagement with a drive shaft, the drive shaft having a diameter and a surface having a discontinuity, the drive engagement mechanism riding on the drive shaft while in a first, engaged, position and while in a second, disengaged, position, the drive engagement mechanism comprising:

a hub adapted for mounting along the drive shaft, the hub having an external surface, a first end and a second end, and an axis extending from the first end towards the second end, the second end having a power transmission component, the hub further having an aperture extending along the axis from the first end towards the second end, so that the hub is adapted to receive the drive shaft through the first end towards the second end, a first portion of the aperture next to the first end of the hub being of a diameter that is approximately equal to the diameter of the drive shaft, so that the diameter of the aperture next to the first end of the hub allows rotational and sliding support of the hub on the drive shaft, a second portion of the aperture near the second end of the hub being occupied by a protrusion extending from the hub into the aperture, the protrusion providing means for engaging the discontinuity of the drive shaft, the means for engaging the discontinuity occupying a portion of the aperture and extending less than a length of the aperture, so that the means for engaging the discontinuity is not in contact with the discontinuity on the drive shaft when the hub is in the second position; and means for moving said hub from said first position to said second position, so that when the hub is in the first position the hub engages the discontinuity on the drive shaft to transmit power from the drive shaft to the power transmission component and when the hub is slid to the second position the hub is disengaged from the discontinuity on the drive shaft.

4. A drive engagement mechanism according to claim 3 wherein said power transmission component comprises a means for transmitting rotary motion.

5. A drive engagement mechanism according to claim 3 wherein said power transmission component comprises a sprocket.

6. A drive engagement mechanism according to claim 3 wherein said protrusion of the hub comprises a single section of material extending across the aperture as a segment.

7. A drive engagement mechanism according to claim 3 wherein said means for moving said hub comprises a lever.

8. A method for providing selective engagement with a drive shaft, the drive shaft having a diameter and a surface having a discontinuity, the method comprising the steps of:

providing a drive engagement mechanism adapted for riding on the drive shaft while in a first, engaged, position and while in a second, disengaged, position, the drive engagement mechanism comprising: a hub adapted for mounting along the drive shaft, the hub having an external surface, a first end and a second end, and an axis extending from the first end towards the second end, the second end having a power transmission component, the hub further having an aperture extending along the axis from the first end towards the second end, so that the hub is adapted to receive the drive shaft through the first end towards the second end, a first portion of the aperture next to the first end of the hub being of a diameter that is approximately equal to the diameter of the shaft, so that the diameter of the aperture next to the first end of the hub allows rotational and sliding support of the hub on the drive shaft, a second portion of the aperture near the second end of the hub being occupied by a protrusion extending from the hub into the aperture, the protrusion providing means for engaging the discontinuity of the shaft, the means for engaging the discontinuity occupying a portion of the aperture and extending less than a length of the aperture, so that the means for engaging the discontinuity is not in contact with the discontinuity on the drive shaft when the hub is in the second position; and means for moving said hub from said first position to said second position;

positioning the hub on the drive shaft; and sliding the hub to the first position so that the hub engages the discontinuity on the drive shaft to transmit power from the drive shaft to the power transmission component and sliding the hub to the second position to disengage the hub from the discontinuity on the drive shaft.

9. A method according to claim 8 wherein said power transmission component comprises a means for transmitting rotary motion.

10. A method according to claim 9 wherein said means for transmitting rotary motion comprises a sprocket.

11. A method according to claim 10 wherein said protrusion of the hub comprises a single section of material extending across the aperture as a segment.

12. A method according to claim 11 wherein said means for moving said hub comprises a lever.

* * * * *